Patented Dec. 29, 1931

1,839,063

UNITED STATES PATENT OFFICE

ROY G. TELLIER, OF WARREN, PENNSYLVANIA, ASSIGNOR TO FRED B. JACKSON, OF WARREN, PENNSYLVANIA

SUBSTANCE PREPARATION

No Drawing.   Application filed June 29, 1929. Serial No. 374,962.

This invention relates to improvements in the treatment of substances to obtain hydrogen-ion control, and particularly to the treatment of cellular substances for such control. Reference is here made to the book entitled The A B C of Hydrogen Ion Control, by W. A. Taylor, Ph. D., fourth edition, second printing, published by La Motte Chemical Products Company, Baltimore, Maryland, 1928, and particularly to pages 17 to 19, and pages 35 to 37, of that work.

According to the theory of electrolytic dissociation, all liquids of which water is a constituent, contain free hydrogen (H) ions and free hydroxyl (OH) ions. When the number of H ions exactly equals the number of OH ions, the solution is said to be neutral. If the number of H ions exceeds that of the OH ions, it is said to be acid. Conversely, if the solution contains an excess of OH ions, it is said to be alkaline. The acidity of a solution increases as the number of H ions therein increases; and the strength of an acid is determined by the concentration of H ions in its solution. Weak acids (e. g., boric acid) are those which are only slightly dissociated in solution and, therefore, give relatively few H ions. Strong acids (e. g., sulphuric acid) are those which are highly dissociated in solution and, therefore, give a large number of H ions. While titration determines both ionized and ionizable hydrogen without separation of or differentiation between the two kinds, it is well known today how to make measurements which determine only the ionized hydrogen. The latter measurements are known in the art as pH measurements or determinations. On the pH scale, the hydrogen-ion concentration of pure distilled water at 22° C. is indicated by the numeral or value 7.0; and readings on the pH scale lower than the value 7.0 (such as 6.0, 5.0, etc.,) denote acidity, the degree of acidity increasing as the readings decrease. The hydrogen (H) ion concentration of an alkaline solution is less, while the hydroxyl (OH) ion concentration thereof is greater, than that of pure distilled water; and readings on the pH scale higher than the value 7.0 indicate alkalinity.

As an exemplification of this invention, there will serve the hereinafter-described treatment of the homogeneous cellular set-gel product described in my pending application Serial No. 166,014; in this instance, the treatment is particularly directed to conferring on this set-gel product pH values that will peculiarly adapt it for use as a clarifying, decolorizing and purifying agent in the filtration of raw-sugar liquors, with which it, of course, comes in contact. Such liquors are highly unstable; and acidity and alkalinity have always been recognized as factors of extreme importance in the manufacture and refining of sugar (see pages 35–37, of Dr. Taylor's book, to which reference has hereinabove been made). There becomes apparent the absolute necessity of controlling such agents so that they will conform to the conditions encountered in the processing, and so that losses by inversion of sucrose by too high acidity of the liquor on the one hand and by decomposition of glucose by too high alkalinity thereof on the other hand, may so far as practicable, be avoided.

In the preparation of the homogeneous cellular set-gel substance described in my pending application aforementioned, the leaching of the material after it has, in the process of manufacture, been dehydrated and subjected to destructive distillation (the carbonizing step), is best and most quickly accomplished by the use of an acid solution. In washing out the excess acid after the leaching has been completed, a certain percentage of the acid is retained in the material and is held fixed by the powers of adsorption. It follows that, when it has been leached in the manner described in the aforesaid application, the set-gel product thereof will possess a pH value on the acid side of the pH scale; that is, this pH value will lie below the neutral point (7.0) of the scale.

I have discovered and thoroughly ascertained and reduced to practice and herein disclose that the aforesaid set-gel product can be chemically treated in various ways so as to conform its pH values with precision to any of the requirements of any of the several uses to which it may be put, among which are included the delicate and critical uses as a clarifying, decolorizing and purifying medium in cane-sugar refining. In the latter, I have demonstrated that I can control and regulate its pH-reactions with such precise accuracy that, if desired, the sugar-liquor that is in contact with it during the refining stage of decolorization and purification, may be filtered off from it after the completion of the decolorization and purification, and the pH-value of the filtered sugar-liquor will be at substantially the neutral point (7.0) on the pH-scale. Or the pH-reactions of the set-gel substance may be just as accurately predetermined and preconditioned, either up or down, so that the pH-value of the filtered sugar-liquor may be either a little below or a little above the neutral point (7.0). In other words, the pH-value of the filtered sugar-liquor may be made to conform precisely to such somewhat different pH-values as might be deemed best and might be desired by different sugar-refiners, and in accordance with the different grades of sugar-liquors and syrups that are undergoing refining. In thus preconditioning the pH-reactions of the aforesaid set-gel substance for sugar-refining, the principal requisite is that a predetermined amount of an alkaline substance that will provide a definite reserve of available or free-OH ions, be stored up in the cells of the alloylike set-gel substance. This reserve of free-OH ions is designed to combat and maintain at neutrality (in equilibrium) the free-hydrogen ions that are spontaneously developed in the raw-sugar solution throughout the time that the sugar-liquor and the alloylike set-gel substance are undergoing hot digestion.

As to the nature of this alkaline substance with which the cellular structure of the homogeneous set-gel substance is to be impregnated, the principal requirements, apart from that of supplying a definite reserve of free-OH ions, are that the alkaline substance itself be of a kind not sufficiently soluble in sugar-solutions to cause a detrimental increase of the ash-content of the filtered sugar-solution that is of a kind susceptible of being so adsorbed and fixed in and on the cell-walls of the set-gel substance in such physical manner that it will not impair and cut down injuriously the decolorizing and purifying properties of the set-gel substance.

I have also discovered and ascertained that, if a suitable alkaline substance (meaning here by suitable an alkaline substance that will properly provide a reserve of free hydroxyl or OH ions and also meet the other requirements hereinabove mentioned) is first dissolved and its solution is then caused to be adsorbed by the cells of the aforesaid homogeneous set-gel substance, and, upon the drying or reburning of the set-gel substance, the alkaline substance be made to undergo such decomposition and molecular change and rearrangement that it will have its chemical and physical properties altered, after it has been adsorbed in and upon the cell walls of the set-gel substance, this alkaline substance will, in that case, either not impair the decolorizing and purifying powers and capacities of the set-gel substance at all or, if to any degree at all, certainly not to any appreciably detrimental degree. To illustrate: If the cells of the alloylike set-gel substance be impregnated with a correct amount of calcium bicarbonate and the set-gel substance be then reheated at temperatures high enough (say, between 700° F. and 900° F.) to drive off the extra $CO_2$ radical and thus to decompose and convert the calcium bicarbonate into calcium carbonate, the set-gel substance will then not only function properly with regard to its pH-reactions with sugar-liquors but its decolorizing and purifying properties will not be lowered but they will, in fact, be increased.

Particularly when it is preferred to conform and condition the pH-values of the alloylike set-gel substance to sugar-refining requirements at the place of manufacture of that substance instead of at the sugar refineries, the following method of effecting such conformation and conditioning is simply, feasibly and efficaciously carried out and may be set forth as follows, to-wit: In the preparation of the alloylike set-gel substance by the utilization of waste sulphite-liquor and Florida fuller's earth and the dispersion of the latter by sulphuric acid, all of which is described in detail in my pending application hereinbefore-mentioned, practically all (at any rate, nearly all) of the mineral and/or metallic salts that are formed as by-products of the reactions occurring during the processing, are of sulphate form at the conclusion of the dehydration and destructive-distillation (carbonization) stage of the preparation. At that point, the mixture of free sulphates includes sulphates of the alkali metals, iron, aluminum and the alkaline earths; these sulphates are here named in the order of the relative amounts in which they occur, beginning with the sulphate of the least amount present in the set-gel substance. Of the alkaline-earth sulphates, calcium sulphate predominates; and, in fact, the amount present of calcium sulphate is greater than the amount of any one of the other sulphates. The aluminum sulphates rank in amount next to calcium sulphate. Calcium sulphate is the least soluble of the sulphates named; the others are much more soluble in water and in even acid solutions; in fact, in the leaching of the set-gel substance after the destructive distillation (charring) step, the start of the leaching may be very effectively done with plain water and a very substantial percentage of the total by-product salts that remain to be removed after the charring or carbonization step, is washed out of the set-gel substance with this agent. The part of the leaching in which an acid solution is used, is best and most cheaply done in the concluding stage of the leaching, at which point in the processing the greater part of the by-product salts that remain to be removed is calcium sulphate, which is only sparingly soluble in plain water but is quite freely soluble in an acid solution. Therefore, the calcium sulphate is the last of the by-product salts to come down in the leaching step; and it is desirable that this be so in those instances of use of the set-gel substance in which calcium sulphate is the desired kind of electrolytic and mordanting agent in the end-product. In those instances, definite amounts of calcium sulphate are permitted to remain in the set-gel substance, being held in union therewith by the principles of adsorption.

But when it is desired, as in the case of cane sugar-refining, to have the electrolytic and mordanting agent of the end-product in the form of calcium carbonate because of the additional value of that salt as a good conditioner of the desired pH-values of the end-product, the conversion of desired amounts of the calcium sulphate over to calcium carbonate may be readily and cheaply accomplished in the following manner, to-wit: In the concluding stage of the leaching step and at just that point thereof when the amount of calcium sulphate remaining in the set-gel substance will provide, upon conversion to the carbonate form, the desired amount of the carbonate in the end-product, the washing is stopped; and the wash-water is followed with a hot solution of sodium carbonate. A solution of the latter of not over five per cent. (5%) strength will suffice, if, during the treatment, the temperatures are maintained at or near the boiling point of water. Under these conditions, the chemical reaction between the calcium sulphate and the sodium carbonate will result in the formation of calcium carbonate, which, because calcium is the stronger base, will remain adsorbed by the set-gel substance; and the other product of the reactions, sodium sulphate, being very soluble (and sodium, as being the weaker base, being incapable of being adsorbed by the set-gel substance in the presence of the calcium), is easily washed out, which is done by following the sodium-carbonate treatment with further washing. If pH-value tests on the treated and rewashed cellular set-gel substance disclose that the amount of calcium carbonate is greater than the desired pH-value for the end-product demands, this excess calcium carbonate may be simply and effectively removed by further treatment of the set-gel substance with a very dilute solution of hydrochloric or other suitable acid of predetermined strength that will give a soluble form of the excess calcium, when the calcium carbonate is dissolved by the acid solution; whereupon this excess soluble calcium salt may be removed by further washing. After the conversion of the calcium to the carbonate form and the rewashing is completed, the set-gel substance is next dried and recharred, preferably in the manner hereinafter described in connection with the treatment of the set-gel substance with mono-calcium-sucrate.

I have further discovered and thoroughly ascertained and reduced to practice that, in cases where it is desired so to do (as in sugar-refining, for instance), the pH-values of the set-gel substance can be effectually, properly and very accurately raised, and the decolorizing and purifying properties can at the same time be appreciably enhanced, by first subjecting the set-gel substance to the action of a definite amount of a suitable alkaline salt precompounded and put into solution with a suitable organic substance (e. g., tannin compounds; albuminous, mucilaginous, glutinous, nitrogenous, and saccharine compounds), then washing out the excess of such alkaline-organic compound not adsorbed and held in the predetermined definite amount desired, next redrying the set-gel substance thus impregnated, and finally recharring the impregnated set-gel substance at temperatures sufficiently high to convert the organic component of the added alkaline-organic compound to carbon. In the selection of a suitable alkaline substance to be first compounded with the organic substance, a wide variety of the alkalis and of alkaline earths may be selected and can be used; in fact, as depending upon the nature of the particular use to which the set-gel substance is destined to be put, one form of alkali or alkaline-earth compound would be better suited than another, and, therefore, an appropriate selection can be made in accordance with the particular requirements to be met. To illustrate: For cane sugar-refining, a calcium salt would be preferable and, of the numerous forms of calcium salts, one would be preferred which, upon either redrying or recharring of the set-gel substance, the calcium will be left impregnated and adsorbed in the cell structure as either calcium oxide or calcium carbonate. Calcium oxide, either the anhydrous or the hydrated form thereof, would be best suited in so far as it would be more active in supplying a definite reserve of OH-ions and in that a less percentage of it would meet the requirements from the pH-standpoint; but, on the other hand, it would not be quite as effective as a decolorizing mordant, would tend to dehydrate the dense sugar liquor to some extent and would be somewhat more soluble in the sugar liquor than would be calcium carbonate. Therefore, from a comprehensive balanced standpoint of initial cost, first-class effectiveness as an OH-ion reserve, a very efficient decolorizing and purifying electrolyte or mordant, and very slight solubility in either water or sugar solution, calcium carbonate is the preferred alkaline substance.

As a specific example, one way of carrying out the present invention and specifically conforming the pH-condition of the set-gel substance to cane-sugar-refining uses is to proceed as follows, to-wit: Calcium oxide (or calcium hydrate) is placed in a suitable container (preferably one that is provided with stirring or other agitating means) and is allowed to stand and digest in water with an amount of saccharine substance that will give a saturated solution of mono-calcium-sucrate,—which is about a two per cent. (2%) solution, if the conditions are right. The preparation of this lime-sucrate and also the subsequent treatment of the set-gel substance therewith should be carried out in the cold; for heat would convert much of the mono-calcium-sucrate to tri-calcium-sucrate, in which form it is only very slightly soluble in water and would be precipitated out and could not properly impregnate the cells of the set-gel substance. Then, in proportion to the amount of set-gel substance to be treated, there is taken an amount of the dissolved lime-sucrate that will provide one per cent. to two per cent. (1%–2%) of the weight of the set-gel substance of available calcium oxide at the end of the subsequent recharring. The tolerance of the one per cent. to two per cent. (1%–2%) of available calcium oxide is due to and is to be contingent upon two things, namely: (1) The precise pH-value, as previously determined, of the set-gel substance to be treated; and (2) The precise pH-value desired for the ultimate product when recharred. The quantity of lime-sucrate solution taken is next diluted with water to a volume that will thoroughly saturate, flood and cover the set-gel substance, if the treatment is to be carried out by still-digestion. If the treatment is to be carried out by slow percolation, however, a larger volume of water may be used; but there are no specific requirements as to the volume of liquid and strength of solution to be used. But, in either event, the time of digestion or contact is to be sufficient to permit the entire cellular structure of the set-gel substance to become thoroughly impregnated with a precalculated amount of available lime-sucrate. Ordinarily, about twelve hours will suffice; but a longer time, in some instances, may prove desirable, particularly if the set-gel substance be in the form of coarse granules. Following the digestion, the impregnated set-gel substance may be washed with plain water, either hot or cold, until any excess of the lime-sucrate, as well as any other undesirable salts developed by the treatment, are removed. Ordinarily, the adsorptive power of the set-gel substance will, regardless of any amount of washing, retain ample of the lime-sucrate for the purposes desired; but, if there is an excess thereof to be removed, this may be done by prolonged washing with cold (but not hot) water; and, in that case, the point at which the washing should cease, may be determined by making pH-value tests of the wash-water. It generally is the case that the pH-value of the wash-water, at the conclusion of the washing, should be from, say, one to one and one-half (1–1½) points higher than the pH-value desired in the ultimate product after recharring. After the treatment and washing as just described, the material is next dried in practically any manner that is most convenient for the operator. When dry, the material is ready for recharring, which may be done in practically any type of furnace that will provide a fairly neutral atmosphere and that is so designed as to exclude practically all air, for, the temperatures necessary for the recharring are sufficiently high to bring about detrimental oxidation of the carbon component of the set-gel substance, if appreciable access of air were permitted. For the recharring, temperatures of about nine hundred degrees Fahrenheit (900° F.) are sufficient and, for best results in all respects, should not exceed one thousand degrees Fahrenheit (1000° F.). Temperatures running from nine hundred and twenty-five to nine hundred and fifty degrees Fahrenheit (925°–950° F.) are very satisfactory and are easily managed. The time of recharring at these temperatures should be continued until all the gases and volatile products of the destructive distillation of the saccharine substance cease to be evolved at the temperatures in use; but no specific time can be named in this example, for the time depends practically entirely upon the type of container and furnace in use and the mass of the material being recharred. However, it may be said, by way of illustration and in order to assist the skilled worker in this art, that, employing half-pint-size cast-iron crucibles snugly-covered and arranged in groups of six in the muffle of a Hoskins electric muffle-type furnace, about four hours were required for the operation, starting from the cold or from room temperature; and half of this period was needed for the gradual raising of the temperature of the material to the temperature hereinbefore mentioned, while the remaining half of the period was consumed in maintaining the material at that temperature. Using pint-size cast-iron crucibles and a gas-and-air Buffalo dental-type of furnace, about six hours are required, of which three hours are needed to bring the material to the temperature specified and the remaining three hours of which are utilized in maintaining the material thereat. Using small graphite crucibles, a much shorter time (that is, in the neighborhood of one hour) is needed for the entire operation. However, if the material is kept moving, large masses may be adequately recharred in relatively short periods of time, as, for example, in a pipe-kiln furnace. After the recharring and cooling of the material, the lime will be present in the set-gel substance in the form of anhydrous calcium oxide. For some sugar-refining uses, and other uses, the set-gel substance may be used directly as of that form; but, if desired, it may be allowed to stand and take up hygroscopic moisture; or, it may directly be quenched in water and then re-dried. In either of the two cases last named, and if out of contact with air, the anhydrous calcium oxide will go over to calcium hydrate; or, if allowed to stand in normal atmosphere, the set-gel substance will take up both moisture and carbon dioxide from the air and, in that case, the calcium oxide will go over to calcium carbonate. If desired to convert the calcium oxide to calcium carbonate more quickly for uses in which the latter form is preferred, the conversion may be simply and cheaply accomplished by subjecting the set-gel substance to a stream of carbon-dioxide gas; and this may be done either by allowing the gas, together with water-vapor, to flow through a bed of the set-gel substance in a dry state, or by first moistening the material and then allowing the gas to pass through it; or the recharred set-gel substance may be immersed in a water solution of carbon-dioxide gas, and then re-dried.

An outstanding advantage of the method hereinbefore described as a specific example is that the treatment may be profitably carried out in the sugar-refineries; in fact, to greater advantage there than at the place of manufacture of the set-gel substance, for the following reasons, viz.: The set-gel substance, when of the lower pH-values, may first be used on low-grade sugars or syrups and molasses etc., then washed and recharred in the manner described and next put to use on the high-grade sugar-liquors. These impure-sugar solutions have in them substantial proportions of mineral salts, among which potassium and calcium predominate; and, if still more lime be desired, it may readily and cheaply be added to them.

The lower pH-values that are possible for the aforesaid homogeneous cellular set-gel substance admirably fit it for use on low-grade impure-sugar solutions. Both in regard to lowering their content of mineral salts and of non-sugar impurities and in regard to improving their color (such content of salts and impurities and such off-color are adverse characteristics of these impure-sugar solutions that cause them ordinarily to have a very low market-value), so uniquely efficient is the action of the set-gel substance on these impure-sugar solutions that their market-value is substantially increased by treatment with it. Following such treatment, the greater part of the mineral salts and organic impurities that have been removed when in a dense solution can, in turn, be readily eliminated from the set-gel substance by simply washing it with hot water; only that amount of mineral salts and organic impurities is left in the set-gel substance as properly to alter its pH-values, in accordance with the processing hereinbefore described.

Furthermore, there are large quantities of various foul wash-waters that require disposal in sugar-refineries. Some of these become so putrid that there are stringent public ordinances against their being permitted to be flowed into streams; and the treatment of them so to modify them that they conform to these laws, is a source of considerable annoyance and expense to the sugar-refiners. An example of one of these waste wash-waters is the so-called sweet-waters derived from the washing out of the filters. When a sweet-water falls below 1° Brix (that is, contains less than one per cent. (1%) of sugar), it no longer pays to evaporate it in order to recover sugar from it; and it is then allowed to run to waste. As an example of one of the methods of treatment of these waste liquids in the refineries so to modify them as to make them comply with the strict regulations governing their disposal, there may be mentioned treatment with lime, which treatment is already in use and is one of the most effective treatments. Therefore I claim distinctive novelty and utility in that I can utilize these waste saccharine wash-liquids, either employing the ones already treated with lime in the refinery routine, or else purposefully, but simply and cheaply, treating any of them with lime as may be found necessary; using them, after they have been subjected to such lime-treatment, to act upon the set-gel substance so as to alter and condition its pH-values in accordance with the hereinabove-described processing; whereupon, the thus-conditioned set-gel substance is put to use on the high-grade cane-sugar liquors.

In the hereinafter-described processing, the step of recharring is omitted and the agent used to impregnate the set-gel substance not only serves to confer upon it a pH-value suitable to condition it for use in contact with raw-sugar liquors but also serves as a mordanting agent in the decolorization of such liquors. This processing is based on the discovery made by me that that phase of the decolorizing action of the set-gel substance which is dependent upon the chemical action and activity of an appropriate mordanting agent may equally as well be provided by an alkaline substance as by an acid radical when the alkaline substance is of the hydroxyl (or basic OH) radical form and is properly hooked-up (i. e., is in chemical and/or physical molecular union) with the substance composing the cell structure or walls of the set-gel substance and when the alkaline substance is thus present in amount (i. e., percentage degree) lying between certain definite limits which vary somewhat as they are dependent upon the nature of the set-gel substance, the percentage degree of chemically and/or physically combined water therein, the degree of its cellularity, the size of its cells, etc. Under the named conditions, the aforesaid homogeneous cellular set-gel substance can be effectively impregnated with alkaline-earth hydroxyls and made into efficient form for use with raw-sugar liquors with respect to both its pH-value and its decolorizing powers in substantially the following manner, to-wit:

Relatively small percentages (the limits of which are fairly definite) of an alkaline (either alkali or alkaline-earth) hydroxide are evenly and uniformly brought into contact with the set-gel substance, the excess liquid is suitably drained off and the set-gel substance is redried under conditions that will not permit of access of carbon dioxide (or other detrimentally active atmospheric gases). These relatively small definite percentages of hydroxide will, during the period of drying, go into chemical and/or physical molecular union or combination with the set-gel substance in such a way that they will not go over to carbonate (or other objectionable form) when the set-gel substance, once it is thoroughly dried, is exposed to atmospheric conditions, and they cannot, in appreciable amounts, be displaced, by exchange action, by other salts or by organic substances of the order of sugar; and, as thus chemically and/or physically combined, these relatively small percentages of alkaline hydroxide that lie within definite limits function practically as well as the acid radicals in the role of mordanting agent in the chemical phase of the decolorizing and impurity-removing actions and properties of the set-gel substance.

In the decolorization and purification of raw-sugar liquors, the hydroxide of calcium is the alkaline substance that has been found by me to be best suited for use, both from a chemical standpoint and from an economic standpoint. Giving consideration to displacement and exchange actions, involving, as they do, the laws of mass action, stronger and weaker bases, stronger and weaker acid radicals, surface tension, comparative atomic and molecular weights and densities, etc., I have discovered and thoroughly ascertained that, when a basic hydroxyl of the order of calcium hydroxide is thus chemically and/or physically combined with a substance of the order of the aforesaid set-gel substance, within definite small percentage limits, as above stated, the hydroxyl cannot be chemically acted upon or altered, or displaced by exchange action by such comparatively weaker elements as atmospheric gases, ordinary salts in solution or organic substances of the order of saccharine solutions; yet, at the same time, as thus combined, these relatively small percentages of the basic hydroxyl will prove effective both as an OH-ion reserve and as a mordanting agent.

The following specific working example is here given in order to assist the skilled worker in this art: One hundred (100) grams of the aforesaid set-gel substance is employed and care should be taken, in the first instance, that it be freed from prior acid radicals as far as accomplishing that is found to be practicable by thoroughly lixiviating (washing) it with plain water, preferably warm water that is rather hot. If all the prior acid-radicals are thus removed excepting that amount which is in chemical and/or physical combination with the set-gel substance and which cannot be removed by contact with plain water alone, this slight amount so remaining will not appreciably affect or have a bearing upon the impregnating of the set-gel substance with the calcium hydroxide. In the processing described in my aforesaid pending application Serial No. 166,014, the prior acid-radicals are those derived from treatment with sulphuric acid and there may be a slight reaction resulting in the formation of a little calcium sulphate, but not enough of it to produce appreciable adverse effects on either the decolorizing powers or the pH-value of the treated product. A quantity of calcium oxide the weight of which is 0.75% of the weight of the set-gel substance employed (that is, three-fourths of a gram of calcium oxide) is dissolved in a quantity of cold water that will furnish a near-saturated solution of the salt (that is, about four hundred and fifty cubic centimeters of water). The reason that a saturated solution is not specified is given hereinafter. The set-gel substance is next poured rapidly into the near-saturated solution and the set-gel substance and the solution are kept in near uniform contact during the period of digestion either by slow continuous agitation or by intermittent agitation. For that size of the set-gel substance identified as 10/30 mesh, which is a size suitable for use in the decolorization and purification of raw-sugar liquors, about four hours of digestion will suffice; but for the fine-mesh form of set-gel substance, only fifteen or twenty minutes of digestion will be needed. After the digestion is completed, the excess free liquid is decanted and the material is drained as quickly as possible; but the material should not be allowed to remain in contact with the air after the free liquid has been drained off from the material. A near-saturated solution and not a saturated solution of the calcium salt has been specified as a starting solution for the reason that there will be some spontaneous heating when the set-gel substance first contacts with the solution and the heat developed will be found sufficient to precipitate out some detrimental calcium hydrate, were a saturated solution used initially. The material is next transferred to an Erlenmeyer flask of, say a capacity of five hundred cubic centimeters and is dried as rapidly as possible at temperatures in the neighborhood of but not exceeding the boiling-point of water (100° C.). For accomplishing this object or purpose, the flask is preferably immersed in a bath of either oil or water. The digestion may be carried out in an Erlenmeyer flask, inasmuch as the flask may be kept stoppered during the entire period of digestion and, in that way, access of any consequential amount of detrimental atmospheric gases may be obviated; furthermore, the agitation hereinabove mentioned may be performed readily by merely turning the flask over end for end. A drying container of the order of an Erlenmeyer flask will make possible rapid evaporation of all the remaining solution-water, except the chemically and/or physically combined water that it may be desired to retain. The calcium hydroxide molecules are rapidly adsorbed and condensed in the cells of the set-gel substance and combine with the substance of the cell-walls, so that there takes place no precipitating out even at final drying temperatures. While ideal drying conditions for combining the basic hydroxyls with the cellular set-gel substance would be such as obtain in a vacuum-type of dryer, other drying methods and media are found by me to be practically as useful as is the latter.

In accordance with the provisions of the patent statutes, I have hereinbefore described the best mode now known to me of carrying this invention into effect; but I desire it to be distinctly understood that I fully realize that changes may be made therein and that I intend to include within the scope of the claim that follows hereinafter all modifications that do not depart substantially from the spirit of the invention set forth therein and thereby. For example: By methods that do not depart materially from the spirit of the hereinbefore-described invention, there may be incorporated, with one substance, another substance that preconditions the pH value thereof and supplies thereto hydrogen ions that impart a desired pH value to a third substance with which the first-named substance is, during its employment, brought into contact.

I claim:

Preconditioning, as to pH value, a substance for use in contact with a second substance by digesting with the first-named substance a suitable alkaline-saccharine substance; dehydrating the resulting product at temperatures sufficiently high to char the organic component of the alkaline-saccharine substance, the alkaline component of which supplies to the product hydroxyl ions that impart to the second substance a desired pH value; and exposing the product to the action of carbon dioxide in order to convert the alkaline component to carbonate form.

Signed at St. Paul, in the county of Ramsey and State of Minnesota, this 27th day of June, 1929.

ROY G. TELLIER.